(12) United States Patent
Bancel et al.

(10) Patent No.: US 8,495,734 B2
(45) Date of Patent: Jul. 23, 2013

(54) METHOD AND DEVICE FOR DETECTING AN ERRONEOUS JUMP DURING PROGRAM EXECUTION

(75) Inventors: Frederic Bancel, Lamanon (FR); Nicolas Berard, Trets (FR); David Hely, Gardanne (FR)

(73) Assignee: STMicroelectronics SA, Montrouge (FR)

( * ) Notice: Subject to any disclaimer, the term of this patent is extended or adjusted under 35 U.S.C. 154(b) by 944 days.

(21) Appl. No.: 12/485,334

(22) Filed: Jun. 16, 2009

(65) Prior Publication Data

US 2009/0254782 A1   Oct. 8, 2009

Related U.S. Application Data

(63) Continuation of application No. PCT/IB2007/003903, filed on Dec. 6, 2007.

(30) Foreign Application Priority Data

Dec. 18, 2006   (FR) ...................................... 06 10991

(51) Int. Cl.
*G06F 11/00* (2006.01)

(52) U.S. Cl.
USPC ................. 726/22; 713/154; 726/26; 726/27; 710/265; 712/221; 712/234; 711/206; 714/50; 714/38.11; 714/38.13

(58) Field of Classification Search
USPC ...................... 726/22; 713/154; 712/233, 234; 712/244
See application file for complete search history.

(56) References Cited

U.S. PATENT DOCUMENTS

| | | | | |
|---|---|---|---|---|
| 4,755,935 A | * | 7/1988 | Davis et al. | 712/233 |
| 4,823,307 A | * | 4/1989 | Melgara et al. | 714/50 |
| 5,408,643 A | * | 4/1995 | Katayose | 714/55 |
| 5,471,620 A | * | 11/1995 | Shimizu et al. | 710/265 |
| 5,491,676 A | * | 2/1996 | Yamaguchi et al. | 369/44.28 |
| 5,532,938 A | * | 7/1996 | Kondo et al. | 708/524 |
| 5,634,136 A | * | 5/1997 | Ohshima et al. | 712/237 |
| 6,272,533 B1 | * | 8/2001 | Browne | 709/213 |

(Continued)

FOREIGN PATENT DOCUMENTS

| | | |
|---|---|---|
| EP | 1450232 A1 | 8/2004 |
| EP | 1507185 A1 | 2/2005 |

(Continued)

OTHER PUBLICATIONS

English Translation of WO 2006045924.*

(Continued)

*Primary Examiner* — Krista Zele
*Assistant Examiner* — Ondrej Vostal
(74) *Attorney, Agent, or Firm* — Seed IP Law Group PLLC (57) ABSTRACT

The present disclosure relates to a method for executing, by a processor, a program read in a program memory, comprising steps of: detecting a program memory read address jump; providing prior to a jump address instruction for jumping a program memory read address, an instruction for storing the presence of the jump address instruction; and activating an error signal if an address jump has been detected and if the presence of a jump address instruction has not been stored. The present disclosure also relates to securing integrated circuits.

30 Claims, 2 Drawing Sheets

U.S. PATENT DOCUMENTS

| | | | |
|---|---|---|---|
| 6,338,136 B1* | 1/2002 | Col et al. | 712/221 |
| 6,470,457 B1* | 10/2002 | Brewer et al. | 713/324 |
| 7,415,638 B2* | 8/2008 | Smith et al. | 714/49 |
| 7,627,745 B2* | 12/2009 | Martinez et al. | 713/2 |
| 8,042,179 B2* | 10/2011 | Shoji et al. | 726/22 |
| 2002/0013894 A1* | 1/2002 | Hoogerbrugge | 712/238 |
| 2002/0184482 A1* | 12/2002 | Lacombe et al. | 713/1 |
| 2003/0131209 A1* | 7/2003 | Lee | 711/170 |
| 2004/0015741 A1* | 1/2004 | Ben-Moyal et al. | 714/38 |
| 2004/0250178 A1* | 12/2004 | Munguia et al. | 714/55 |
| 2005/0076226 A1* | 4/2005 | Boivie et al. | 713/187 |
| 2005/0087342 A1* | 4/2005 | Christensen | 166/285 |
| 2005/0125634 A1* | 6/2005 | Ishizuka | 712/218 |
| 2006/0212690 A1* | 9/2006 | Magoshi | 712/234 |
| 2007/0101205 A1* | 5/2007 | Purrington et al. | 714/55 |
| 2007/0101317 A1* | 5/2007 | Shoji et al. | 717/131 |
| 2007/0239975 A1* | 10/2007 | Wang | 712/241 |
| 2007/0250703 A1* | 10/2007 | Giraud et al. | 713/154 |
| 2008/0028180 A1* | 1/2008 | Newman et al. | 711/206 |
| 2008/0104704 A1* | 5/2008 | Mohandas | 726/26 |

FOREIGN PATENT DOCUMENTS

| | | |
|---|---|---|
| WO | 0122223 A1 | 3/2001 |
| WO | 2004023274 A2 | 3/2004 |
| WO | 2005008451 A1 | 1/2005 |
| WO | WO 2006045924 A1 * | 5/2006 |

OTHER PUBLICATIONS

English Translation of WO 2006059444.*
WO2006045924, Giraud et al, Protection Against Attacks by Generation of Errors on Jump Instructions, May 4, 2006.*
WO2006059444, Noda et al, Multi-Processor System and Program Execution Method in the System, Jun. 8, 2006.*
Chang et al., "A Biased Random Instruction Generation Evironment for Architectural Verification of Pipelined Processors", 1999.*
Iyer et al., "Hardware and Software Error Detection".*
Gunneflo et al., "Evaluation of Error Detection Schemes Using Fault Injection by Heavy-ion Radiation", 1989.*

* cited by examiner

METHOD AND DEVICE FOR DETECTING AN ERRONEOUS JUMP DURING PROGRAM EXECUTION

BACKGROUND

1. Technical Field

The present disclosure relates to the protection of integrated circuits against attacks by error injection, and particularly to the protection of integrated circuits present in smart cards.

The present disclosure relates more particularly to a method for securing the execution of a program by a processor (microprocessor or microcontroller) of the chip.

2. Description of the Related Art

Figure 1:
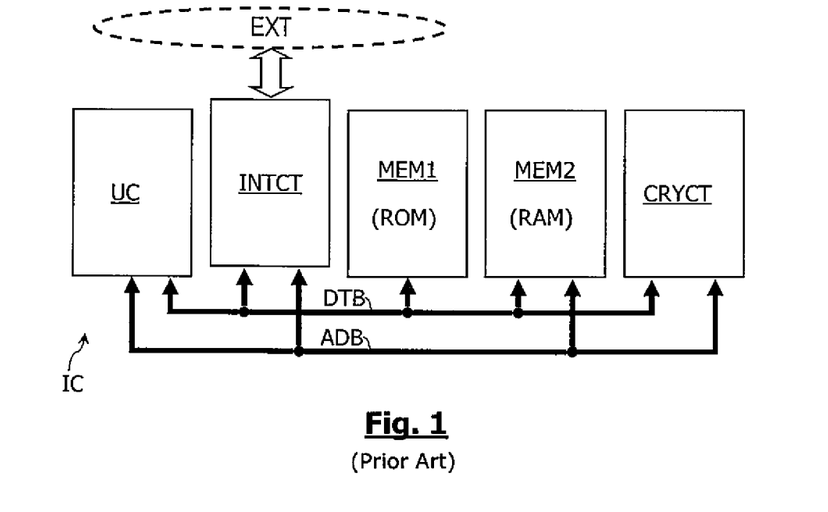
FIG. 1 previously described represents an integrated circuit in block form.

FIG. 1 shows an example of an integrated circuit IC for smart card or electronic tag. The integrated circuit IC comprises a microprocessor central processing unit UC, one or more non-volatile memories MEM1 (e.g., ROM, EEPROM, FLASH), one or more volatile memories MEM2 (e.g., RAM), an encryption circuit CRYCT enabling the integrated circuit to authenticate itself during a transaction, and an interface circuit INTCT enabling it to communicate with external smart card or electronic tag readers (EXT). The interface circuit INTCT can be of the contact type and comprise for example ISO 7816 contacts (e.g., clock, data, supply, ground contacts). The interface circuit INTCT can also be of the RFID contactless type (Radio Frequency Identification) and comprise an antenna coil RF or an antenna circuit UHF, modulation and demodulation circuits for modulating and demodulating incoming and outgoing data, a clock extractor circuit, etc. The central processing unit UC, the memories MEM1, MEM2 and the circuit CRYCT are linked to each other by a data bus DTB and an address bus ADB.

Secured integrated circuits, such as integrated circuits for smart cards, are the subject of various attacks by hackers who try to discover their structure and/or the secrets they contain. They are for example cryptography circuits of DES, AES, RSA, etc. type, microprocessors programmed to execute cryptography algorithms, register banks containing secret keys, etc.

The most advanced hacking methods currently involve injecting errors into an integrated circuit during the execution of so-called sensitive operations, such as authentication operations or operations of executing a cryptography algorithm for example.

Such attacks, referred to as attacks by error injection or fault injection, can occur during so-called sensitive calculation phases, such as during phases of calculating an identification code or during the reading of an encryption key in a memory. They enable, in combination with mathematical models and from false results obtained intentionally thanks to glitches, a secret element such as an encryption key or a password to be defined, the structure of a cryptography algorithm and/or the secret keys the algorithm uses to be deduced, etc.

In particular, localized attacks involve introducing glitches at a determined point of the circuit, for example by means of a laser beam or an X-ray beam. A localized attack can concern the supply voltage, a data or address path, or the clock signal of the integrated circuit.

Thus an attack can concern the data read in the program memory (bus DTB), and cause a modification of an instruction code passing through a data bus. The modified instruction code can be interpreted as a jump although the instruction read was not a jump instruction, or as another instruction although the instruction read was a jump instruction. Such a modification can also cause a modification of the operand associated with a jump instruction code, i.e., modify the destination address of the jump. The jump or the absence of jump thus caused is then final.

The attack can also concern the program memory read address, it can cause a jump in the absence of any jump instruction code. If the attack concerns the path of the program memory read addresses (bus ADB), the jump is fleeting and only relates to a single address read, since the program counter of the central processing unit is not modified, except if the instruction code read is a jump. If the attack causes a modification of the program counter, the jump is final.

When the jump is final, it can lead to the execution of a data discharge routine that is inaccessible in normal operation, or to checking procedures being bypassed.

BRIEF SUMMARY

One embodiment of the present disclosure increases the protection of a secure processor executing a program, by detecting erroneous address jumps.

One embodiment is a method for executing, by a processor, a program read in a program memory, the method comprising steps of:
  detecting a program memory read address jump,
  prior to a jump address instruction for jumping an address in the program, providing an instruction for storing the presence of the jump address instruction, and
  activating an error signal if an address jump has been detected and if the presence of a jump address instruction has not been stored.

According to one embodiment, the method comprises a step of providing, at a destination address of the jump address instruction, an instruction for storing an access to the destination address.

According to one embodiment, the method comprises a step of activating the error signal if the presence of a jump instruction has not been stored before the access to the destination address was stored.

According to one embodiment, the method comprises steps of:
  activating a counter further to storing the presence of the jump address instruction,
  erasing the storing of the presence of the jump address instruction further to storing the access to the destination address of the jump, and
  activating the error signal when the counter arrives at the end of counting if the storing of the presence of the jump address instruction has not been erased.

According to one embodiment, the method comprises steps of erasing the storing of the presence of the jump address instruction upon each program memory read cycle while the counter is not active.

According to one embodiment, the method comprises a step of providing an instruction for erasing the storing of the presence of a jump instruction further to a conditional jump instruction in the program memory.

According to one embodiment, the method comprises steps of providing an unconditional jump instruction further to a conditional jump instruction in the program memory, instructions for storing the presence of jump instructions before the conditional and unconditional jump instructions, and instructions for storing the access to the destination addresses of the unconditional and conditional jumps.

According to one embodiment, the presence of the jump address instruction is stored by loading a value in a first register, and the access to the destination address of the jump is stored by loading the same value in a second register, the error signal being activated if the first and second registers do not save the same value further to the write in the second register.

According to one embodiment, the value loaded in the first and second registers is different for each jump instruction.

According to one embodiment, the detection of erroneous jumps is inhibited during the triggering and at the end of the execution of an interrupt handler.

The present disclosure also relates to an integrated circuit comprising a program memory and a central processing unit to execute a program stored in the program memory. According to one embodiment, the integrated circuit comprises a device for detecting an erroneous jump comprising:
- a detector circuit for detecting a program memory read address jump,
- a first register for storing the execution of a jump address instruction by the central processing unit, the first register being write-accessible by an instruction executable by the central processing unit, and
- an address jump error detector circuit comprising means for activating an error signal if an address jump has been detected by the address detector circuit and if the first register does not indicate that a jump address instruction has been executed by the central processing unit.

According to one embodiment, the device for detecting an erroneous jump comprises a second register for storing the access to a destination address of a jump address instruction, the second register being write-accessible by an instruction executable by the central processing unit.

According to one embodiment, the error detector circuit comprises means for activating the error signal if the second register has been write-accessed before the first register.

According to one embodiment, the error detector circuit comprises:
- a counter which is activated further to a write in the first register,
- means for erasing the first register further to a write in the second register, and
- means for activating the error signal when the counter arrives at the end of counting if the first register has not been erased.

According to one embodiment, the error detector circuit comprises means for erasing the first register upon each program memory read cycle while the counter is not active.

According to one embodiment, the error detector circuit comprises means for comparing the content of the first and second registers further to the write in the second register, and for activating the error signal if the first and second registers do not save the same value.

According to one embodiment, the jump detector circuit comprises two registers loaded with the last two addresses read in the program memory and a comparator for determining whether or not the addresses stored in the two registers are successive.

BRIEF DESCRIPTION OF THE SEVERAL VIEWS OF THE DRAWINGS

Features and advantages of the present disclosure shall be presented in greater detail in the following description of an embodiment of the present disclosure, given in relation with, but not limited to the following figures, in which.

DETAILED DESCRIPTION

Figure 2:
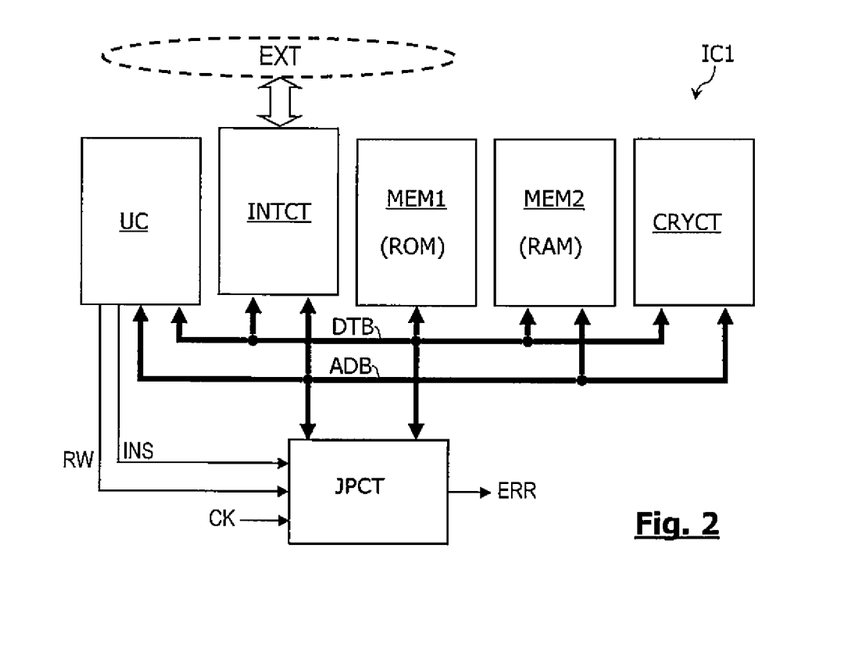
FIG. 2 represents in block form an integrated circuit equipped with a device for detecting an erroneous jump according to one embodiment.

FIG. 2 represents an embodiment of an integrated circuit IC1 that may be used for a smart card or an electronic tag. The integrated circuit IC1 comprises a microprocessor central processing unit UC, one or more non-volatile memories MEM1 (e.g., ROM, EEPROM, FLASH), one or more volatile memories MEM2 (e.g., RAM), an encryption circuit CRYCT enabling the integrated circuit to authenticate itself during a transaction, and an interface circuit INTCT enabling it to communicate with an external reader EXT, such as an external smart card reader or an electronic tag reader. The interface circuit INTCT can be of the contact type and comprise for example ISO 7816 contacts (clock, data, supply, ground contacts, etc.). The interface circuit INTCT can also be of the RFID contactless type (Radio Frequency Identification) and comprise an antenna coil RF or an antenna circuit UHF, modulation and demodulation circuits for modulating and demodulating incoming and outgoing data, a clock extractor circuit, etc. The central processing unit UC, the memories MEM1, MEM2 and the circuit CRYCT are linked to each other by a data bus DTB and an address bus ADB.

According to one embodiment, the integrated circuit IC1 comprises a detection device JPCT configured to detect the erroneous jumps which may occur, during the execution of a program stored in the non-volatile memory MEM1, due to an attack by error injection. The device JPCT is connected to the address bus ADB and to the data bus DTB and receives from the integrated circuit IC1 a clock signal CK pacing the reading of the program memory. The device JPCT receives from the central processing unit UC an instruction read signal INS indicating when an instruction code is being read in the program memory, and a write- or read-access selection signal RW. The device JPCT supplies a signal for detecting an erroneous jump ERR which is for example applied to the central processing unit UC. The central processing unit can thus take any appropriate action in response to an erroneous program jump being detected.

Figure 3:
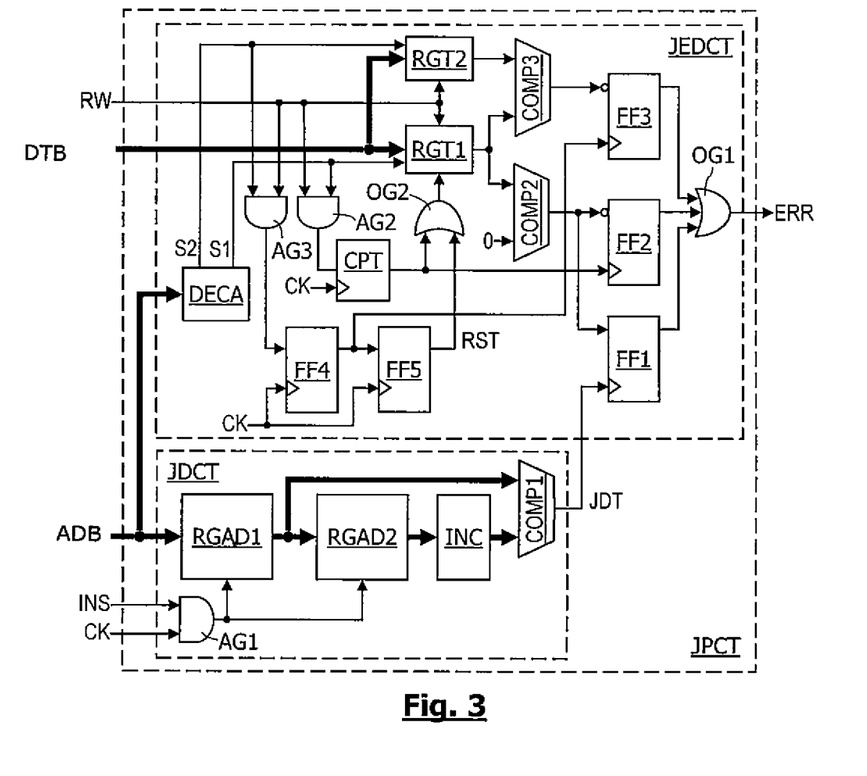
FIG. 3 is an electronic circuit of one embodiment of the device for detecting an erroneous jump.

FIG. 3 represents one embodiment of the device JPCT. The device JPCT comprises a jump detector circuit JDCT for detecting a jump in the program memory read address, and a jump error detector circuit JEDCT.

The circuit JDCT comprises two address registers RGAD1, RGAD2, an increment circuit INC, a comparator COMP1 and an AND-type logic gate AG1. The register RGAD1 is connected to the address bus ADB of the integrated circuit IC1. The register RGAD2 is connected to the output of the register RGAD1. The output of the register RGAD2 is connected to the input of the circuit INC. The registers RGAD1 and RGAD2 are write-controlled by the output signal of the gate AG1 receiving at input the clock signal CK of the circuit IC1 and the signal INS indicating the read of an instruction code in the program memory. Therefore, at the start of each program memory read cycle, the register RGAD1 is loaded with the address circulating on the address bus ADB, and the register RGAD2 is loaded with the address stored in the register RGAD1 during the previous read cycle. The address saved in the register RGAD2 is incremented by one by the circuit INC, and then applied to an input of the comparator COMP1. The address saved in the register RGAD1 is applied to another input of the comparator COMP1. Therefore, the comparator COMP1 supplies a signal JDT indicating whether or not the last two successive program memory read addresses are consecutive.

At the start of the execution of a program, further to the initialization of the circuit JDCT, the two registers RGAD1 and RGAD2 save an initial value which does not correspond to the first program memory MEM1 read address. It is therefore preferable to inhibit the circuit during the two read cycles used to load the register RGAD2 with the first program memory MEM1 read address.

The circuit JEDCT comprises an address decoder DECA connected to the address bus ADB, and two registers RGT1, RGT2 connected to the data bus DTB of the integrated circuit IC1, and receiving a write command signal RW from the integrated circuit IC1. The address decoder DECA supplies two selection signals S1, S2 enabling one or other of the registers RGT1, RGT2 to be accessed according to the address sent by the bus ADB. Thus, the central processing unit UC can address one or other of the two registers RGT1, RGT2 to write a datum sent by the bus DTB therein.

The circuit JEDCT comprises two comparators COMP2, COMP3. The comparator COMP2 compares the content of the register RGT1 with 0, and the comparator COMP3 compares the content of the two registers RGT1 and RGT2.

The circuit JEDCT comprises a counter CPT paced by the clock signal CK and an AND-type logic gate AG2 receiving the signal RW and the signal S1. The output of the gate AG2 is connected to an activation input of the counter CPT. Thus, the counter CPT is activated when the register RGT1 is write-selected.

The circuit JEDCT comprises an AND-type logic gate AG3, two flip-flops FF4, FF5 paced by the clock signal CK, and an OR-type logic gate OG2 one input of which is connected to the output of the counter CPT. The gate AG3 receives the signal RW and the signal S2 for selecting the register RGT2. The output of the gate AG3 is connected to the input of the flip-flop FF4. Therefore the flip-flop FF4 changes state when the register RGT2 is write-selected. The output of the flip-flop FF4 is connected to the input of the flip-flop FF5. The output of the flip-flop FF5 supplies a signal RST which is sent to the input of the gate OG2. The output of the gate OG2 controls the initialization of the register RGT1.

The circuit JEDCT comprises three flip-flops FF1, FF2, FF3. The clock signal input of the flip-flop FF1 receives the jump detection signal JDT at output of the comparator COMP1. The flip-flop FF1 comprises an input connected to the output of the comparator COMP2. The clock signal input of the flip-flop FF2 is connected to the output of the counter CPT. The flip-flop FF2 comprises an inverted input connected to the output of the comparator COMP2. The clock signal input of the flip-flop FF3 is connected to the output of the flip-flop FF4. The flip-flop FF3 comprises an inverted input connected to the output of the comparator COMP3. Each of the outputs of the flip-flops FF1, FF2, FF3 is connected to an input of an OR-type logic gate OG1. The output of the gate OG1 supplies the erroneous jump detection signal ERR.

The register RGT1 is initialized at each cycle of the clock signal CK when the counter is on 0. The register RGT2 is on 0 when the device JPCT is initialized. A write in the register RGT2 automatically triggers the comparator COMP3. After a clock cycle, the flip-flop FF4 triggers the flip-flop FF3. If the two registers RGT1 and RGT2 do not save the same value, the flip-flop FF3 causes the error signal ERR to go to 1. After the next clock cycle, the signal RST at output of the flip-flop FF5 changes to 1, which triggers the initialization of the register RGT1.

Upon each write in the register RGT1, the counter CPT is triggered to count a few cycles of the clock signal CK. At the end of the counting, the counter initializes the register RGT1 and triggers the flip-flop FF2.

If the jump is triggered by the execution of a jump instruction, the register RGT1 has been previously loaded to a non-zero value. If the jump is not performed to an address provided in the program, the register RGT2 remains on 0. The result is that the comparator COMP3 is not triggered before the counter CPT reaches the value 0. When the counter CPT changes to 0, the flip-flop FF2 is triggered. If the value of the register RGT1 is non-zero, the output signal of the flip-flop FF2 and therefore the error signal ERR change to 1.

Implementing the device JPCT involves providing sequences of instructions for loading registers RGT1, RGT2 before and after a jump.

The following sequences of instructions, given as an example, are provided for each instruction which produces an unconditional jump (e.g., unconditional jump instruction, instruction for calling a subprogram or for returning from a subprogram):

|  |  |  |
|---|---|---|
|  | ...... |  |
|  | LD A,VAL1 | / Loading VAL1 |
|  | LD RGT1,A | /    in the register RGT1 |
|  | JP LABEL1 | / Jump to the address LABEL1 |
|  | ...... |  |
| LABEL1 | LD A,VAL1 | / At the address LABEL1, |
|  | LD RGT2,A | /    loading VAL1 in |
|  | ...... | /    the register RGT2 |

In the sequences of instructions above, each instruction which produces an unconditional jump is preceded by instructions for loading a non-zero value VAL1 in the register RGT1. At the address LABEL1 reached by the jump (or at the beginning of the subprogram called, or after an instruction calling the subprogram), instructions for loading the same value VAL1 in the register RGT2 are provided.

If a program memory read address jump is detected by the circuit JDCT, the signal JDT is on 1. If the register RGT1 is on 0, this means that the jump detected is not triggered by the execution of a jump instruction. The comparator COMP2 then supplies a signal of 1 to the input of the flip-flop FF1 which causes the error signal ERR to go to 1.

When the program loads the value VAL1 in the register RGT1, this triggers the counter CPT and therefore stops the initialization of the register RGT1. If when the jump is executed, the program memory read address changes to the address of the jump LABEL1, the circuit JDCT detects the jump. The flip-flop FF1 is then triggered, but does not cause the error signal to go to 1 since the register RGT1 is not on 0. In parallel, the program at the address LABEL1 loads the value VAL1 in the register RGT2, which triggers the comparison by the comparator COMP3 between the two registers RGT1 and RGT2. After a cycle of the signal CK, the flip-flop FF3 copies the output signal of the comparator COMP3. If the contents of the two registers RGT1 and RGT2 are identical, the address jump in the program memory is indeed triggered by the program and has been performed to the proper address LABEL1. The signal ERR thus remains on 0. If the jump is performed to another address, two cases can occur depending on whether or not the destination address provided for the jump is a destination address of a jump.

If the jump reaches an address that does not correspond to a destination address of a jump, the register RGT2 is not write-accessed and the comparator COMP3 is not triggered before the counter CPT reaches the end of the counting. At the end of the counting, the counter CPT reaches the value 0. The flip-flop FF2 is then triggered. If the register RGT1 is on a non-zero value (indicating the presence of a jump instruction), the signal at output of the flip-flop FF2 and therefore the error signal ERR change to 1. The end of the counting also triggers the initialization of the register RGT1.

If the jump reaches a destination address of another jump provided in the program, the register RGT2 is write-accessed, which triggers the comparison of the registers RGT1 and RGT2. The erroneous jump will not be detected if the registers RGT1 and RGT2 are always loaded with the same value VAL1. On the other hand, if for each jump provided in the program, different values are loaded in the registers RGT1 and RGT2, the comparison of the registers RGT1 and RGT2 performed by the comparator COMP3 will show a difference if the jump is performed to an erroneous jump address.

The following sequences of instructions, given as an example, are provided for each conditional jump of the program.

|  | ...... | |
|---|---|---|
|  | LD A,VAL1 | / Loading VAL1 |
|  | LD RGT1,A | / in the register RGT1 |
|  | CP X,#$DD | / comparison instruction |
|  | JREQ LABEL1 | / conditional jump according / to the result of the / comparison / to the address LABEL1 |
|  | CLR RGT1 | / erasing register RGT1 |
|  | ...... | |
| LABEL 1 | LD A,VAL1 | / At the address LABEL1, |
|  | LD RGT2,A | / loading VAL1 in |
|  | ...... | / the register RGT2 |

Each instruction which produces a conditional jump is preceded by instructions for loading a non-zero value VAL1 in the register RGT1. The instruction following the conditional jump is followed by an instruction for setting the register RGT1 to 0 (executed in the event that the jump condition is not met). At the address reached by the conditional jump LABEL1, instructions for loading the same value VAL1 in the register RGT2 are provided.

If the jump is not performed, the register RGT1 is initialized. As a result, when the counter CPT arrives at the end of counting, the comparator COMP2 detects that the register RGT1 is on 0 and does not trigger the rise of the signal ERR to 1.

This solution is not totally reliable, because if the jump address is distorted and corresponds to the current address (of the jump instruction) incremented by 1, the register RGT1 is erased, and the jump error will not be detected. To avoid this disadvantage, it is sufficient to duplicate the sequences of test and conditional jump instructions with an instruction for setting the register RGT1 to 0 between the two sequences.

It shall be noted that, in some embodiments, the loading of a value different from 0 in the register RGT1, when the latter is not on 0, is not authorized. Indeed, in some such embodiments, it may be necessary to wait for the counter CPT to end its counting so as not to risk masking erroneous jumps. The counting time of the counter CPT is therefore preferably chosen as short as possible so as to avoid having to insert waiting instructions between two close jump instructions. Therefore, the duration of the counter CPT can be chosen equal to the maximum duration of the execution of a jump (e.g., jump instruction, instruction for calling a subprogram or for returning from a subprogram) to which the register RGT2 loading time (1 cycle of the signal CK) and the state change time of the two flip-flops FF4 and FF5 (two cycles of the signal CK) have been added.

The counting time of the counter CPT should also be chosen as short as possible to be capable of detecting erroneous jumps which would be performed a few instructions before the destination address of a jump instruction.

Outside the periods in which the counter CPT is active (counting), the counter is on 0 and the output thereof is on 1. The register RGT1 is therefore initialized at each cycle of the signal CK. This therefore avoids its content being durably modified by a glitch.

Further to the error signal ERR changing to the active state, any appropriate action can be taken, such as the erasing of sensitive data in one of the memories MEM1. If the signal ERR is applied to the central processing unit UC, the re-initialization of the central processing unit, or even completely taking the integrated circuit IC1 out of service can be provided. Any other emergency measure well known to those skilled in the art can be taken when the error signal ERR changes to the active state.

It shall be noted that if the instructions for loading the register RGT2 are executed in the absence of a jump (register RGT1 on 0), a jump error is generated (signal ERR on 1) due to the fact that the write in the register. RGT2 triggers the comparison of the content of the two registers by the comparator COMP3 and the flip-flop FF3. To avoid this disadvantage, it is sufficient to previously load the value of the register RGT2 in the register RGT1 or to provide a jump instruction so as not to execute these instructions.

For the sake of simplicity, various signals that can easily be provided by those skilled in the art have not been described above. For example, although the signals enabling the registers and the flip-flops of the device JPCT to be initialized have not been described, it goes without saying that such initialization signals may be provided.

If the execution of the program executed by the central processing unit UC can be interrupted by an interrupt signal triggering the execution of an interrupt handler, the central processing unit should not take into account the error signal ERR at least when launching and at the end of the execution of an interrupt handler. Indeed, the launch of the execution of an interrupt handler causes an address jump which can appear at any time during the execution of the program. It is not therefore possible to load the registers RGT1 and RGT2 before and after the jumps resulting from the execution of an interrupt handler.

Alternatively, means can be provided for inhibiting the device JPCT so that it does not generate any error. The device JPCT can be inhibited by masking the error signal ERR at output of the device JPCT, for example using an AND-type logic gate receiving the error signal and an inhibiting signal. The device can also be inhibited by forcing the signal INS to 0 at least when launching and at the end of the execution of the interrupt handler. Therefore, the device JPCT or the circuit JDCT can be inhibited further to the jump to the interrupt handler, during only two program memory read cycles used to load the register RGAD2 with the first address of the interrupt handler. For the same reason, the device JPCT or the circuit JDCT should also be inhibited during two program memory read cycles after the end of the execution of the interrupt handler.

It will be understood by those skilled in the art that various alternative embodiments and applications of the present disclosure may be made. In particular, the present disclosure is not limited to a device for detecting jump errors which checks whether each jump performed during the execution of a jump instruction by the integrated circuit is performed to the address specified in the operand associated with the jump instruction. Indeed, an embodiment of the present disclosure may be limited to checking that each jump detected results from the execution of a jump instruction. In some such embodiments, only the jump detector circuit JDCT, the register RGT1, the comparator COMP2 and the flip-flop FF1 are used. Providing these components merely enables the detection of jump errors to be made more systematic.

Furthermore, it is not necessary to provide registers of several bits to store the fact that a jump instruction will be executed or that the destination address of the jump has been accessed. Indeed, these two events can be simply stored by raising a flag, i.e., by changing the state of a flip-flop. Providing registers of several bits making it possible to store different values enables the detection of jump errors to be refined. Indeed, by establishing a link between the jump instruction and its jump destination address, it is possible to check that a jump is not performed to a destination address of another jump.

It will be understood that the present disclosure is applicable to any processor (e.g., microprocessor or microcontroller) and not solely to integrated circuits of smart cards.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method, comprising:
    executing, by a processor, a program loaded in a program memory, the program including a first instruction for storing a first value in a first address, the storing of the first value in the first address indicating a subsequent jump address instruction;
    storing the first value in the first address;
    activating a counter in response to the storing of the first value;
    executing the jump address instruction;
    detecting a read address jump in the program memory;
    activating an error signal in response to detecting the read address jump if the detecting of the read address jump occurs prior to the storing of the first value in the first address;
    executing, at a destination address of the jump address instruction, an instruction from the program for storing an indication of an access to the destination address; and
    activating the error signal when the counter arrives at an end of counting if the first value is still stored in the first address.

2. The method according to claim 1, further comprising activating the error signal if the first value has not been stored in the first address before the indication of the access to the destination address of the jump was stored.

3. The method according to claim 1, further comprising erasing the first address upon each program memory read cycle while the counter is not active.

4. The method according to claim 1, wherein the first value is stored by loading the first value in a first register, and the indication of the access to the destination address of the jump is stored by loading the first value in a second register, the error signal being activated if the first and second registers do not each have the first value.

5. The method according to claim 4, wherein the program includes a plurality of jump instructions, and wherein the first value is the first of a plurality of distinct values loaded in the first and second registers during the executing of the program, each of the plurality of distinct values corresponding to one of the plurality of jump instructions.

6. The method according to claim 1, further comprising executing an instruction for erasing the first value from the first address based at least in part on a conditional jump instruction in the program memory being executed.

7. The method according to claim 1 wherein the jump address instruction is an unconditional jump address instruction, wherein the storing of the first value in the first address is performed before the executing of the unconditional jump address instruction, and wherein the method further comprises:
    executing by the processor a conditional jump instruction in the program memory;
    executing an instruction for storing an indication of the conditional jump instruction before executing the conditional jump instruction; and
    executing an instruction for storing an indication of an access to the destination address of the conditional jump instruction.

8. The method according to claim 1, wherein the detecting of the read address jump is inhibited during a triggering of and an end of an execution of an interrupt handler.

9. The method of claim 1, further comprising activating the error signal if the indication of an access to the destination address is stored prior to the first value being stored.

10. An integrated circuit, comprising:
    a program memory;
    a central processing unit configured to execute a program stored in the program memory; and
    a device configured to detect an erroneous jump in the program memory, the device including:
        a jump detector circuit configured to detect a program memory read address jump;
        a first register configured to store a first value in response to an instruction from the program, the storing of the first value in the first register being an indication of a subsequent jump address instruction to be executed by the central processing unit, the first register being write-accessible by an instruction executable by the central processing unit;
        a second register configured to store an indication of an access to a destination address of the jump address instruction, the second register being write-accessible by an instruction executable by the central processing unit; and
        an address jump error detector circuit configured to activate an error signal if an address jump has been detected by the jump detector circuit and if the first register is not storing the first value;
    wherein the address jump error detector circuit is further configured to activate the error signal if the second register has been write-accessed before the first register.

11. An integrated circuit, comprising:
    a program memory;
    a central processing unit configured to execute a program stored in the program memory; and
    a device configured to detect an erroneous jump in the program memory, the device including:

a jump detector circuit configured to detect a program memory read address jump;

a first register configured to store a first value in response to an instruction from the program, the storing of the first value in the first register being an indication of a subsequent jump address instruction to be executed by the central processing unit, the first register being write-accessible by an instruction executable by the central processing unit;

a second register configured to store an indication of an access to a destination address of the jump address instruction, the second register being write-accessible by an instruction executable by the central processing unit; and an address jump error detector circuit configured to activate an error signal if an address jump has been detected by the jump detector circuit and if the first register is not storing the first value;

wherein the address jump error detector circuit includes a counter configured to be activated based on a write in the first register, and wherein the address jump error detector circuit is further configured to:

erase the first register based on a write in the second register; and activate the error signal when the counter arrives at an end of counting if the first register has not been erased.

12. The integrated circuit according to claim 11, wherein the address jump error detector circuit is further configured to erase the first register upon occurrences of program memory read cycles while the counter is not active.

13. The integrated circuit according to claim 10, wherein the address jump error detector circuit is further configured to compare content of the first register to content of the second register and to activate the error signal if the first and second registers do not store the same value.

14. The integrated circuit according to claim 10, wherein the jump detector circuit includes two registers respectively configured to be loaded with the last two addresses read in the program memory, and a comparator configured to determine whether the addresses stored in the two registers are successive.

15. The integrated circuit according to claim 10, wherein the integrated circuit is one of a smart card and an electronic tag.

16. A device, comprising:

a jump detector configured to detect a read address jump in a program memory;

a first memory configured to store a first value in response to a first instruction being executed by a processor executing a program, the storing of the first value in the first memory indicating a subsequent jump address instruction, the first memory being write-accessible via an instruction executed by the processor;

a second memory configured to store an indication of an access to a destination address of the jump address instruction, the second memory being write-accessible by an instruction executable by the processor; and an address jump error detector configured to activate an error signal if an address jump has been detected by the jump detector and if the first memory is not storing the first value, the address jump error detector being further configured to activate the error signal if the second memory has been write-accessed before the first memory.

17. A device, comprising:

a jump detector configured to detect a read address jump in a program memory;

a first memory configured to store a first value in response to a first instruction being executed by a processor executing a program, the storing of the first value in the first memory indicating a subsequent jump address instruction, the first memory being write-accessible via an instruction executed by the processor;

a second memory configured to store an indication of an access to a destination address of the jump address instruction, the second memory being write-accessible by an instruction executable by the processor; and an address jump error detector configured to activate an error signal if an address jump has been detected by the jump detector and if the first memory is not storing the indication of the jump address instruction;

wherein the address jump error detector includes a counter which is configured to be activated based at least in part on the storing of the first value in the first memory occurring, wherein the address jump error detector is further configured to erase the first memory when a write in the second memory occurs, and to activate the error signal if the first memory has not been erased when the counter arrives at an end of counting.

18. The device according to claim 17, wherein the address jump error detector is further configured to erase the first memory upon each program memory read cycle that occurs while the counter is not active.

19. The device according to claim 16, wherein the address jump error detector is further configured to compare the first memory to the second memory, and activate the error signal if the first and second memories do not have the same value stored.

20. The device according to claim 16, wherein the first and second memories are registers.

21. A method, comprising:

executing, by a processor, a program loaded in a program memory;

storing a first value, the storing of the first value being an indication of a jump address instruction;

activating a counter based on the first value being stored by the storing;

executing the jump address instruction;

detecting a read address jump in the program memory;

activating an error signal in response to detecting the read address jump if the first value has not been previously stored prior to the detecting the read address jump;

executing, at a destination address of the jump address instruction, an instruction for storing an indication of an access to the destination address; and activating the error signal when the counter arrives at an end of counting if the stored first value has not been erased.

22. The method of claim 21, further comprising erasing a memory in which the first value was stored by the storing upon each program memory read cycle while the counter is not active.

23. An integrated circuit, comprising:

a program memory;

a central processing unit for executing a program stored in the program memory; and a device for detecting an erroneous jump in the program memory, the device including:

a jump detector circuit for detecting a program memory read address jump;

a first register for storing a first value, the storing of the first value in the first register indicating an execution of a jump address instruction by the central processing unit, the first register being write-accessible by an instruction executable by the central processing unit; and an address jump error detector circuit including means for activating an error signal if an address jump has been detected by the jump detector circuit and if the first register is not storing the first value;

wherein the device for detecting the erroneous jump further includes a second register for storing an indication of an access to a destination address of the jump address instruction, the second register being write-accessible by an instruction executable by the central processing unit; and wherein the address jump error detector circuit further includes means for activating the error signal if the second register has been write-accessed before the first value has been stored in the first register.

24. The integrated circuit according to claim 23, wherein the address jump error detector circuit further includes means to compare content of the first register to content of the second register and to activate the error signal if the first and second registers do not store the same value.

25. An integrated circuit, comprising:
a program memory;
a central processing unit for executing a program stored in the program memory; and
a device for detecting an erroneous jump in the program memory, the device including:
  a jump detector circuit for detecting a program memory read address jump;
  a first register for storing a first value, the storing of the first value in the first register being an indication of an execution of a jump address instruction by the central processing unit, the first register being write-accessible by an instruction executable by the central processing unit; and
  an address jump error detector circuit including means for activating an error signal if an address jump has been detected by the jump detector circuit and if the first register is not storing the first value;
wherein the device for detecting the erroneous jump further includes a second register for storing an indication of an access to a destination address of the jump address instruction, the second register being write-accessible by an instruction executable by the central processing unit; and
wherein the address jump error detector circuit further includes,
  a counter which is activated based on a write in the first register;
  means for erasing the first register based on a write in the second register; and
  means for activating the error signal when the counter arrives at an end of counting and if the first register has not been erased.

26. The integrated circuit according to claim 25, wherein the address jump error detector circuit further includes means for erasing the first register upon occurrences of program memory read cycles while the counter is not active.

27. A device, comprising:
a jump detector configured to detect a read address jump in a program memory;
a first memory configured to store a first value, the storing of the first value in the first memory indicating an execution of a jump address instruction by a processor executing a program, the first memory being write-accessible via an instruction executed by the processor;
an address jump error detector configured to activate an error signal if an address jump has been detected by the jump detector and if the first memory is not storing the first value; and
a second memory for storing an indication of an access to a destination address of the jump address instruction, the second memory being write-accessible by an instruction executable by the processor;
wherein the address jump error detector is further configured to activate the error signal if the second memory has been write-accessed before the first memory.

28. The device according to claim 27, wherein the address jump error detector is further configured to compare the first memory to the second memory and to activate the error signal if the first and second memories do not each have the first value stored.

29. A device, comprising:
a jump detector configured to detect a read address jump in a program memory;
a first memory configured to store a first value, the storing of the first value in the first memory being an indication of an execution of a jump address instruction by a processor executing a program, the first memory being write-accessible via an instruction executed by the processor;
an address jump error detector configured to activate an error signal if an address jump has been detected by the jump detector and if the first memory is not storing the first value; and
a second memory for storing an indication of an access to a destination address of the jump address instruction, the second memory being write-accessible by an instruction executable by the processor;
wherein the address jump error detector includes a counter which is activated based at least in part on a write in the first memory occurring, wherein the address jump error detector is further configured to erase the first memory when a write in the second memory occurs, and to activate the error signal if the first memory is storing the first value when the counter arrives at an end of counting.

30. The device according to claim 29, wherein the address jump error detector is further configured to erase the first memory upon each program memory read cycle that occurs while the counter is not active.

* * * * *